Oct. 20, 1970 R. C. AMERO ET AL 3,534,859
APPARATUS FOR REMOVAL OF OIL FLOATING ON WATER OR THE LIKE
Filed March 11, 1969 2 Sheets-Sheet 1

INVENTORS.
ROBERT C. AMERO
GARNET L. KARNER

Oct. 20, 1970   R. C. AMERO ET AL   3,534,859
APPARATUS FOR REMOVAL OF OIL FLOATING ON WATER OR THE LIKE
Filed March 11, 1969   2 Sheets-Sheet 2

INVENTORS.
ROBERT C. AMERO
GARNET L. KARNER

… … …

United States Patent Office 3,534,859
Patented Oct. 20, 1970

---

3,534,859
APPARATUS FOR REMOVAL OF OIL FLOATING ON WATER OR THE LIKE
Robert C. Amero, Glenshaw, and Garnet L. Karner, Monroeville, Pa., assignors to Gulf Research & Development Company, Pittsburgh, Pa., a corporation of Delaware
Filed Mar. 11, 1969, Ser. No. 806,220
Int. Cl. B01d 17/02
U.S. Cl. 210—242
10 Claims

ABSTRACT OF THE DISCLOSURE

A device for removing and collecting oil floating on water comprising a first inner member which serves as both a main flotation member and a notched weir, and an outer buoyancy member held above the flotation member and closely adjacent the surface of the oil. A flotsam screen is provided. An inflatable embodiment easily carried on vessels or other vehicles is also provided.

---

Figure 1:
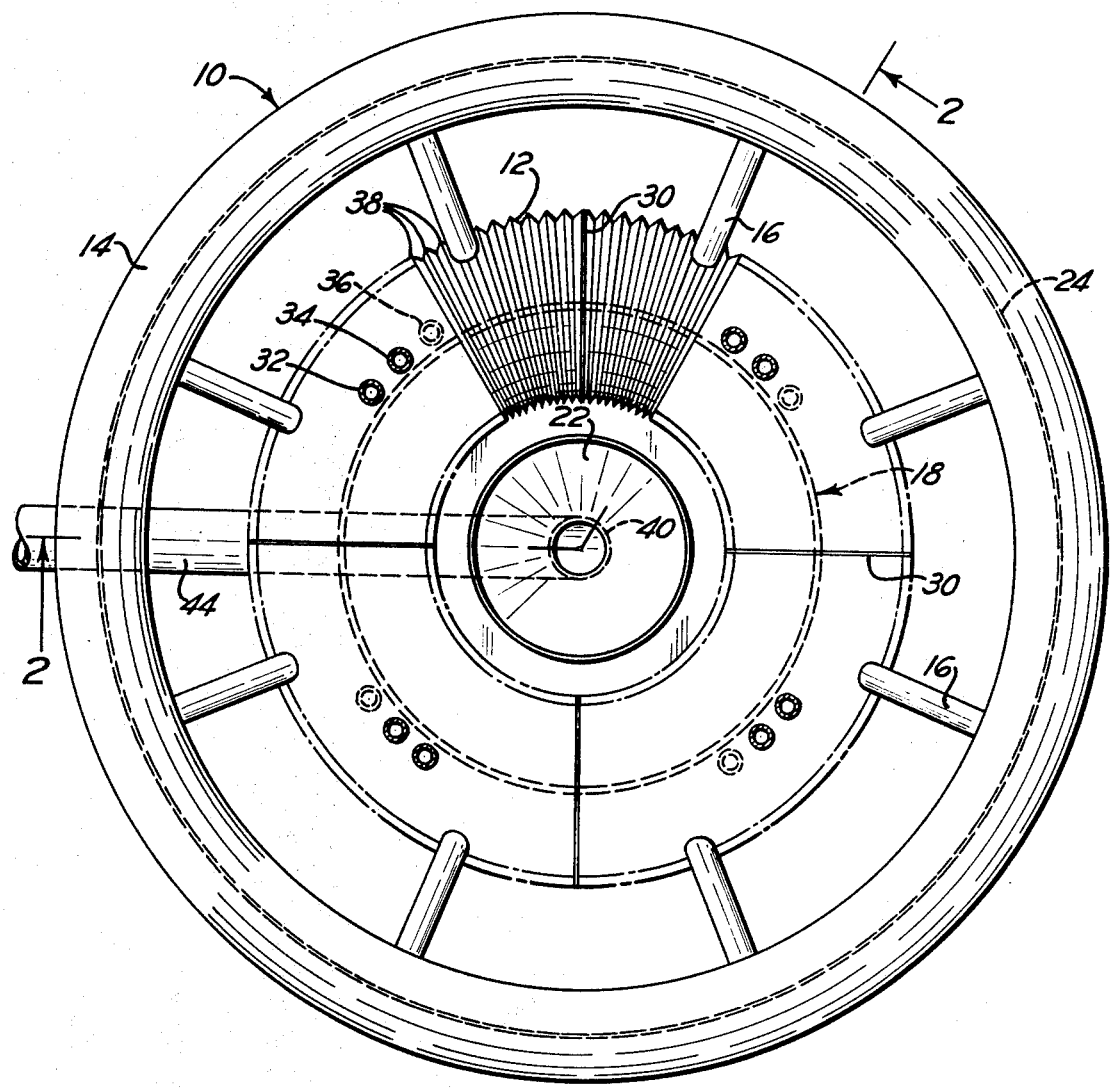

This invention relates to the art of removing a liquid floating on top of another liquid, and more particularly is directed to an apparatus for use in removing hydrocarbon liquids floating on bodies of water, such as rivers, lakes, harbors, and even the open sea.

The presence of oil floating on such waters has long been a problem. It constitutes a fire hazard, but more importantly pollutes the water for fish, fowl, and humans, ruins bathing beaches, and is in general a serious nuisance. Many methods and apparatuses have been proposed to solve the problem. Most of these methods fall into two general classes: firstly, there are those that seek to sink, disperse, or otherwise get rid of the oil within the body of water, and secondly there are those that seek to physically remove the oil from the water. The first class of solutions suffer from the disadvantages that they often entail the use of expensive chemical detergents or other materials to combine with the oil to either decompose it or cause it to sink and remain sunk. These chemicals are generally expensive, expose wildlife to chemical reactions, and the results are not wholly satisfactory in that the oil often floats back to the surface or is not fully decomposed. Additionally, the value of the oil so lost may be substantial.

The second class of solutions, physical recovery of the oil, does overcome most of the above disadvantages, but suffers from a different group of disadvantages. Generally, the necessary apparatuses or devices are complex, costly, large, and heavy, often operate slowly, and do not always achieve fully satisfactory results. Because of their general nature outlined above, such devices are only useful, as a practical matter, in harbors, in rivers, or other places closely adjacent to land where the device can be stored and serviced readily. They are usually expensive to use, maintain, and store.

The present invention provides apparatus of the recovery type which is exceedingly simple to manufacture, inexpensive, and highly effective in use achieving substantially 100% recovery of oil floating on water at very high recovery rates. The invention also provides an embodiment fabricated of air-tight sheet material adapted to be easily and quickly inflated from a source of any compressed gas and simply introduced into the body of water to commence oil recovery. This speed factor, i.e., the relatively short time needed to make the apparatus of the invention operative, is important in that the oil may be recovered while it is still localized and before it has had a chance to spread or to be moved by the winds and/or tides. Additionally, the inflatable embodiment of the apparatus of the invention can be folded or stored in a small place and easily carried by any sort of vehicle for immediate use, even far from land on the sea.

Within the broad class of physical recovery types of devices, there are absorption sub-types, and direct removal sub-types including the present invention. The absorption class of device depends on some kind of "sponge-like" action followed by some kind of "squeezing the sponge" type of final recovery. These methods and apparatuses are inherently slow, which slowness has been proven by actual usage. Because the absorption media total pore space is a limitation, two discreet steps are required, and the absorption media must be brought into contact with the oil rather than the oil naturally flowing towards the point of collection.

The present invention is characterized by a gravity flow of the oil into the device resulting in an exceedingly high rate of recovery, with the primary limitation on recovery rate being the capacity of the pump, which pump capacity may be easily increased, even at the site.

Figure 2:
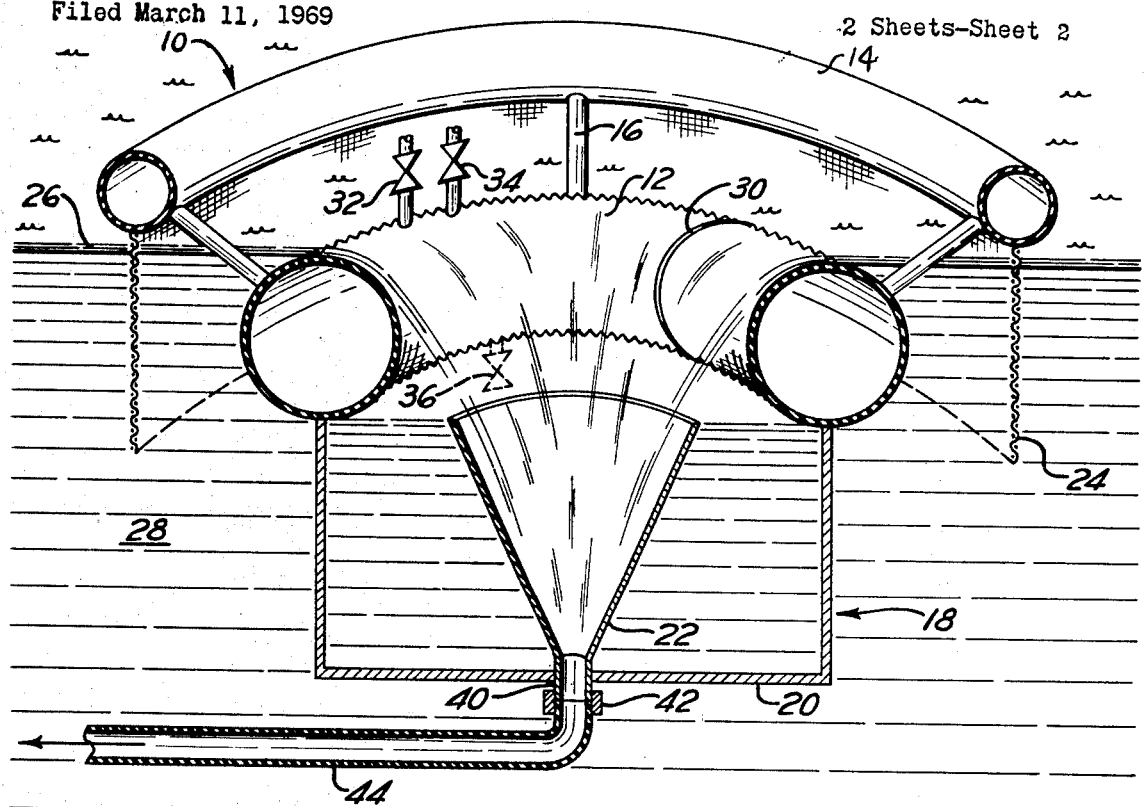
Figure 3:
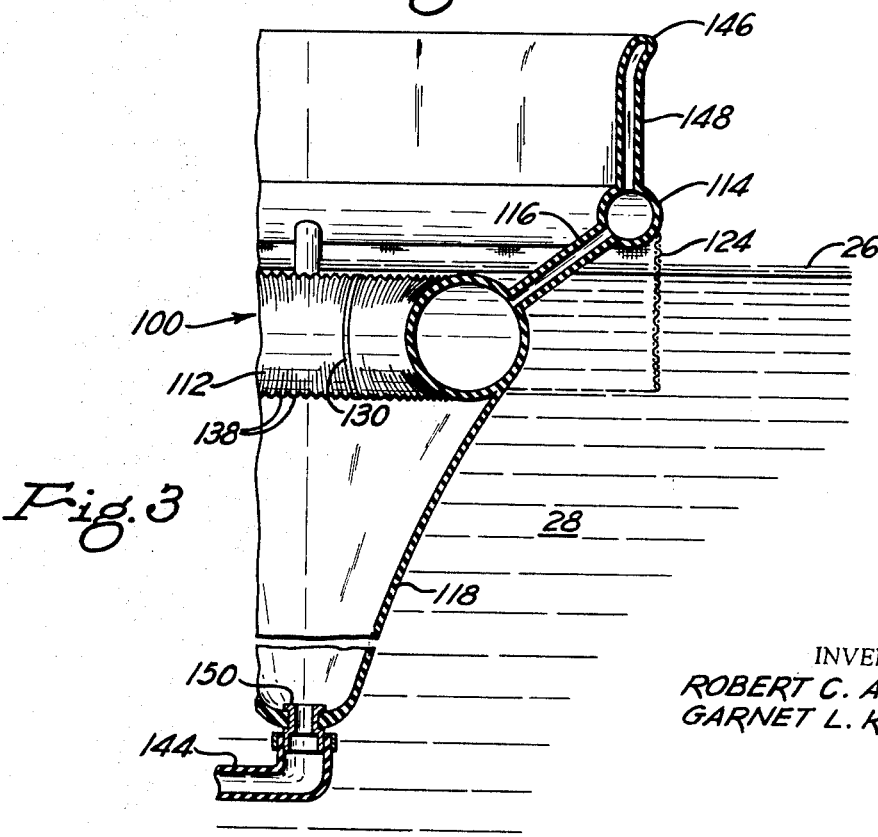

The above and other advantages of the invention will be pointed out or will become evident in the following detailed description and claims, and in the accompanying drawing also forming a part of the disclosure, in which:
FIG. 1 is a top plan view of a first embodiment of an apparatus embodying the invention; FIG. 2 is a cross-sectional view taken on line 2—2 of FIG. 1; and FIG. 3 is a view similar to a portion of FIG. 2 showing a second embodiment.

Referring now in detail to the drawing, 10 designates an oil recovery device embodying the invention. Device 10 comprises an inner flotation member 12, an outer stabilizing and buoyancy member 14, and a plurality of rib members 16 interconnecting the members 12 and 14. Suspended from inner flotation member 12 is a combined tank and funnel assembly 18 which comprises a tank member 20 within which is nested a funnel member 22. Suspended from outer buoyancy member 14 is a screen 24 which extends down from member 14 through the layer of oil 26 and into the water 28 below the level of the uppermost portion of inner member 12, or lower. The screen will surround the inner member even where the outer member is discontinuous, or provided with a gap or gaps, as described below.

Means are provided to adjustably control the buoyancy of the overall device by controlling the amount of air and water within inner flotation member 12, and to also control the horizontal position of the device so as to keep the top surface of the flotation member 12 level. The buoyancy control permits location of the top surface of the inner member at a predetermined level with respect to the oil-water interface. To this end, flotation member 12 is divided into a plurality of separate compartments by a number of transverse dividing members 30. Four compartments are shown by way of example only, it being understood that fewer or more compartments could be provided, as required, by selection of a different number of dividers 30. Each compartment carries a first valve means 32 which may be a compressed air fitting to permit filling the compartment with compressed air; second valve means 34 which may comprise an air release valve; and a third valve means 36 which may comprise a combined water inlet and outlet valve. By manipulating the ratio of compressed air and water in each compartment of member 12, the overall buoyancy of the entire device may be controlled. Thus, by selectively changing the air to water ratio in the various compartments, the device may be caused to float with the top surface of the flotation member 12 both level and at any predetermined level with respect to the oil-water interface.

Means are provided to present a notched or irregular surface or weir to the liquid which is to flow into and be salvaged by the device 10. Such a surface provides advantages over a smooth surface in certain situations, which smooth surface is also operable particularly with thick layers of oil, because it is thought that a notched weir will improve buoyancy stability and improve the oil recovery efficiency of the device particularly while operating in thin oil films. The precise physics resulting in these advantages are not understood. However, it is thought that the notched weir improves stability because the peaks serve as a part of the apparatus tending to be above the top of the water, and the valleys serve to promote cohesion of the droplets of oil making up a thin film into streamlets which flow more readily than the droplets to and then across the weir. To this end, flotation member 12 is torus-shaped and is provided with ridges 38 on its outside surface transverse to its circular axis. It will be understood by those skilled in the art that device 10 could have any configuration such as square or rectangular, or the like, so long as it closes on itself, and the round shape shown is by way of example only. Similarly, the outer buoyancy member 14 is shown as a closed torus by way of example only, and it is anticipated that gaps in the outer member could be provided so that particularly when operating with thick oil layers, the member 14 would not block the flow of oil into the device.

Means are provided to transport the oil collected by the apparatus of the invention to other locations. To this end, funnel member 22 comprises a neck 40 which passes through a suitably formed opening in the bottom of tank 20, and suitable connecting means 42 are provided to connect neck 40 to a hose or other liquid transmission member 44, to carry away the collected hydrocarbon liquids. A suitable pump, not shown, will be provided to draw the collected liquids away, after which they may be reprocessed, which reprocessing basically comprises removing any water collected with the oil. It is noteworthy that both the necessary pump and a source of compressed air or other gas are already available in virtually all locations where the invention would be used.

Referring now to FIG. 3, a second embodiment 100 of the invention is shown. Parts of this embodiment similar to parts described above are indicated by the same reference numeral increased by 100.

Means are provided to permit use of the apparatus of the invention in uneven water. To this end, a wave suppressing fin 146 is provided at the upper edge of outer buoyancy member 114. This fin extends vertically upwardly from the buoyancy member 114 and flares outwardly at its upper end. The fin serves to break waves impinging upon the device to thereby create a region of relatively calm water in which the apparatus may operate. The fin 146 also prevents excessivly large amounts of water from being carried into the device with the oil. In the event an apparatus embodying the invention should be built with gaps in the outer member 14 or 114 for the reasons set forth above, the fin could be made to bridge across the gap or gaps since the fin would normally be located above the top of the oil.

Most basically, the second embodiment 100 of FIG. 3 differs from the first embodiment 10 in that it is made of sheet air-tight material 148 so that it may be collapsed and folded into a relatively small easily carried parcel when not in use, and rapidly inflated for use. Materials deemed suitable for use in this embodiment include neoprene coated canvas, plastic covered nylon, synthetic rubber, and the like.

It will be understood that various features shown in only one embodiment and not the other are interchangeable. For example, fin 146, in the form of sheet metal, could be included in the rigid embodiment 10 of FIGS. 1 and 2. Similarly, the funnel 22 could be incorporated in the embodiment 100 of FIG. 3 either of sheet metal or other rigid material. As shown, the tank 118 may be somewhat larger than the tank 18 of FIG. 1 in that the embodiment 100 will be more buoyant than the embodiment 10 and therefore the additional weight of water and oil would help to equalize the buoyancy. However, this effect could be overcome by adjustment of the buoyancy of member 112 just as described above with reference to member 12. It will be understood that member 112 will also be compartmented with individual air and water valves to control buoyancy overall to keep the upper surface of member 112 at any predetermined orientation with respect to the oil-water interface. This ability to keep the top weir surface of member 112 within the layer of oil is important where very thick layers of oil are involved. On occasion, layers of oil up to nine inches in thickness have occurred. In removing such a thick layer, it would not be desirable to create a nine inch hydrostatic head of oil above the weir surface, because the force of such a large quantity of moving liquid could upset normal operation. The ability to move the weir surface with respect to the oil-water interface by adjusting overall buoyancy, overcomes this disadvantage. In place of the neck 40 and connecting means 42, embodiment 100 includes a collar 150 which may be integrally mounted in the sheet material 148 forming tank 118 to which hose 144 may be attached by any suitable means such as a threaded connection, lock nuts, or the like. Both screens 24 and 124 may be formed of woven wire screening or netting or other suitable material.

In fabricating embodiment 10, a convenient material for use as flotation member 12 are steel culvert L's which are of relatively thin wall construction, have a relatively large displacement, and are therefore buoyant. Such L's are easily handled, are inexpensive, and are already formed with corrugations to serve the purpose of ridges 38. The valves required are standard hardware items, and suitable materials for the remaining parts are readily available.

Hydraulically, it is good practice to provide a gentle slope from the collection device 10 or 100 up to the pump. To this end, hoses 44 and 144 may be provided with spaced floats to hold them up and/or may be made of the newer synthetic materials which have a neutral buoyancy in water or a slight tendency to float.

While the invention has been described in detail above, it is to be understood that this detailed description is by way of example only, and the protection granted is to be limited only within the spirit of the invention and the scope of the following claims.

We claim:

1. Apparatus for collecting liquid floating on bodies of water comprising an inner flotation member, an outer member substantially surrounding said inner flotation member, means joining said inner and outer members, means to cause the apparatus to float in the body of water with the uppermost portion of said inner flotation member at a predetermined level with respect to the interface between the body of water and the liquid floating on the water, a collection vessel extending downwardly from said inner flotation member, means to transport said liquid and any water flowing over said inner member and into said vessel away from the apparatus, and said inner member being formed with a plurality of ridges along its outer surface parallel to the direction of liquid flow over said inner member.

2. The combination of claim 1, said inner member being of torus shape, said means to cause the apparatus to float with the uppermost portion of said inner member at a predetermined level with respect to said interface comprising means to divide said inner member into a plurality of individual air tight compartments, each of said compartments comprising air valve means and water valve means, whereby the overall buoyancy of the apparatus may be selectively controlled and the apparatus may be caused to float with the topmost surface of the inner member at said predetermined level.

3. The combination of claim 1, fin means extending upwardly from said outer member and surrounding said inner member, said fin means comprising an outwardly flared portion at its outer end, whereby the effect of waves impinging upon said apparatus is minimized to create a region of relatively calm water and floating liquid in the vicinity of said inner member and the amount of water entering said collection vessel is minimized.

4. The combination of claim 1, said vessel comprising a tank and a funnel extending upwardly from the bottommost portion of said tank.

5. The combination of claim 1, said apparatus being of rigid construction, and said inner member comprising a plurality of culvert L's joined together to form said inner member.

6. The combination of claim 5, separation means between each of said culvert L's, whereby said inner member is made up of a plurality of separate air tight compartments.

7. The combination of claim 1, the apparatus being of collapsible structure and adapted to be inflated with a compressed gas.

8. The combination of claim 7, said apparatus consisting essentially of gas impervious sheet material.

9. The combination of claim 1, said outer member being located above said inner member and formed with at least one gap.

10. The combination of claim 1, screen means extending downwardly from said outer member into said liquid and said water to a location below the uppermost portion of said inner member and surrounding said inner member.

References Cited

UNITED STATES PATENTS

| 2,497,177 | 2/1950 | McClintock et al. | 210—242 X |
| 2,778,500 | 1/1957 | Fuller | 210—242 X |
| 2,989,185 | 6/1961 | Lombardi | 210—242 X |
| 3,369,664 | 2/1968 | Dahan | 61—1 |

FOREIGN PATENTS

| 454,047 | 1/1966 | Switzerland. |
| 1,064,367 | 8/1955 | Germany. |

REUBEN FRIEDMAN, Primary Examiner

T. A. GRANGER, Assistant Examiner